（12）United States Patent
Robertson et al.

(10) Patent No.: US 12,320,521 B2
(45) Date of Patent: Jun. 3, 2025

(54) REGENERATIVE BURNER SYSTEM AND METHOD OF USE

(71) Applicant: Fives North American Combustion, Inc., Cleveland, OH (US)

(72) Inventors: Thomas F. Robertson, Medina, OH (US); Mark Hannum, Hudson, OH (US)

(73) Assignee: Fives North American Combustion, Inc., Cleveland, OH (US)

( * ) Notice: Subject to any disclaimer, the term of this patent is extended or adjusted under 35 U.S.C. 154(b) by 310 days.

(21) Appl. No.: 18/307,345

(22) Filed: Apr. 26, 2023

(65) Prior Publication Data

US 2023/0366541 A1  Nov. 16, 2023

Related U.S. Application Data

(63) Continuation of application No. 17/230,139, filed on Apr. 14, 2021, now Pat. No. 11,668,460.

(Continued)

(51) Int. Cl.
*F23L 15/02*     (2006.01)
*F23C 7/00*      (2006.01)
(Continued)

(52) U.S. Cl.
CPC ............... *F23L 15/02* (2013.01); *F23C 7/00* (2013.01); *F23C 7/06* (2013.01); *F23C 9/06* (2013.01);
(Continued)

(58) Field of Classification Search
CPC ...... F23C 7/00; F23C 7/06; F23C 9/06; F23C 2900/06041; F23D 14/02; F23D 14/105;
(Continued)

(56) References Cited

U.S. PATENT DOCUMENTS 3,856,496 A * 12/1974 Nesbitt .................. C03B 5/235
                                                        65/346
5,569,312 A * 10/1996 Quirk ..................... C03B 5/235
                                                        110/212
(Continued)

FOREIGN PATENT DOCUMENTS

CA          3037730 A1    10/2016
CN        104411931 A      3/2015
(Continued)

OTHER PUBLICATIONS

Fives North American Cobustion, Inc., North American TwinBed II Overview, Bulletin 4343, Feb. 2020.
(Continued)

*Primary Examiner* — Steven B McAllister
*Assistant Examiner* — Benjamin W Johnson
(74) *Attorney, Agent, or Firm* — Benesch Friedlander Coplan & Aronoff LLP

(57) ABSTRACT

A method heats a furnace process chamber with the combustion of fuel gas. The method heats the process chamber in a preheat mode when the temperature of the process chamber is below the autoignition temperature of the fuel gas. The preheat mode forms preheated combustion air by directing the combustion air through a regenerative bed. A stream of the preheated combustion air is directed into the process chamber in a condition unmixed with fuel gas. The preheat mode also forms a fuel rich mixture of the fuel gas and unheated combustion air. The fuel rich mixture is directed into the process chamber adjacent to the stream of preheated combustion air.

9 Claims, 4 Drawing Sheets

Related U.S. Application Data

(60) Provisional application No. 63/128,551, filed on Dec. 21, 2020.

(51) Int. Cl.
  *F23C 7/06* (2006.01)
  *F23C 9/06* (2006.01)
  *F23D 14/02* (2006.01)
  *F23D 14/10* (2006.01)
  *F23D 14/46* (2006.01)
  *F23D 14/64* (2006.01)
  *F23D 14/66* (2006.01)
  *F23D 14/70* (2006.01)

(52) U.S. Cl.
  CPC .... *F23C 2900/06041* (2013.01); *F23D 14/02* (2013.01); *F23D 14/105* (2013.01); *F23D 14/46* (2013.01); *F23D 14/64* (2013.01); *F23D 14/66* (2013.01); *F23D 14/70* (2013.01); *F23L 2900/15021* (2013.01); *F23L 2900/15022* (2013.01); *Y02E 20/34* (2013.01)

(58) Field of Classification Search
  CPC .......... F23D 14/46; F23D 14/64; F23D 14/66; F23D 14/70; F23L 15/02; F23L 2900/15021; F23L 2900/15022; Y02E 20/34
  USPC ............................................................ 431/2
  See application file for complete search history.

(56) References Cited

U.S. PATENT DOCUMENTS

| | | |
|---|---|---|
| 5,954,498 A | 9/1999 | Joshi et al. |
| 6,171,100 B1 * | 1/2001 | Joshi .................... C03B 5/2353 431/189 |
| 7,666,345 B2 | 2/2010 | Robertson et al. |
| 8,083,517 B2 | 12/2011 | Newby et al. |
| 8,961,169 B2 | 2/2015 | Newby et al. |
| 10,663,229 B2 | 5/2020 | Yokoi et al. |
| 2002/0090583 A1 * | 7/2002 | Cain ........................ F23N 1/02 431/278 |
| 2009/0246719 A1 * | 10/2009 | Newby ................... F23N 1/022 431/5 |
| 2013/0196277 A1 | 8/2013 | Newby et al. |
| 2018/0111866 A1 | 4/2018 | MacPhee et al. |

FOREIGN PATENT DOCUMENTS

| | | |
|---|---|---|
| CN | 109751599 A | 5/2019 |
| WO | 2019118633 | 10/2009 |
| WO | 2016210233 A1 | 12/2016 |

OTHER PUBLICATIONS

Final Office Action issued in related U.S. Appl. No. 17/230,139, dated Dec. 8, 2022.

Non-Final Office Action issued in related U.S. Appl. No. 17/230,139, dated Jun. 23, 2022.

* cited by examiner

REGENERATIVE BURNER SYSTEM AND METHOD OF USE

RELATED APPLICATIONS

This application is a continuation application of U.S. patent application Ser. No. 17,230,139 filed on Apr. 14, 2021 which claims priority to provisional U.S. patent application No. 63/128,551 filed on Dec. 21, 2020. Each of these applications is incorporated by reference.

TECHNICAL FIELD

This technology relates to a regenerative burner for heating a furnace.

BACKGROUND

A regenerative burner is used for heating a furnace process chamber with the combustion of fuel gas. Such a burner is operated in cycles, including firing cycles that are alternated with exhaust cycles. In a firing cycle, a mixture of fuel gas and combustion air is provided for combustion in the process chamber. In an exhaust cycle, high temperature exhaust gas is withdrawn from the process chamber and driven through a bed of regenerative material. This heats the regenerative material, which can then be used to preheat combustion air for a subsequent firing cycle. A pair of regenerative burners is operated in tandem, with one of the two burners operating in a firing cycle while the other is operating in an exhaust cycle.

SUMMARY

A method is provided for heating a furnace process chamber with the combustion of fuel gas. The method heats the process chamber in a preheat mode when the temperature of the process chamber is below the autoignition temperature of the fuel gas. The preheat mode forms preheated combustion air by directing the combustion air through a heated regenerative bed. A stream of the preheated combustion air is directed into the process chamber in a condition unmixed with fuel gas. The preheat mode also forms a fuel rich mixture of the fuel gas and unheated combustion air. The fuel rich mixture is directed into the process chamber adjacent to the stream of preheated combustion air.

Summarized differently, the method heats the process chamber in a preheat mode by directing gas into and out of the process chamber in alternating cycles when the temperature of the process chamber is below the autoignition temperature of the fuel gas. These include firing cycles in which gas is directed into the process chamber, and exhaust cycles in which gas is directed out of the process chamber and into a regenerative bed. The gas directed into the process chamber in a firing cycle includes a combustion air stream. The combustion air stream is directed through the regenerative bed for preheating, and enters the process chamber free of fuel gas.

An apparatus also is provided. The apparatus includes a furnace having a process chamber, a source of fuel gas, and a source of combustion air. The apparatus further includes a regenerator and a reactant delivery device.

The regenerator has a bed of regenerative material in air flow communication with the source of combustion air. The regenerator also has a combustion air plenum with a port configured to direct a stream of combustion air from the bed of regenerative material into the process chamber. Additionally, the regenerator is free of a fuel flow structure configured to direct fuel gas into the plenum.

The reactant delivery device is configured to form a combustible mixture of fuel gas and combustion air, and to direct the combustible mixture into the process chamber adjacent to the stream of combustion air.

DETAILED DESCRIPTION

Figure 1:
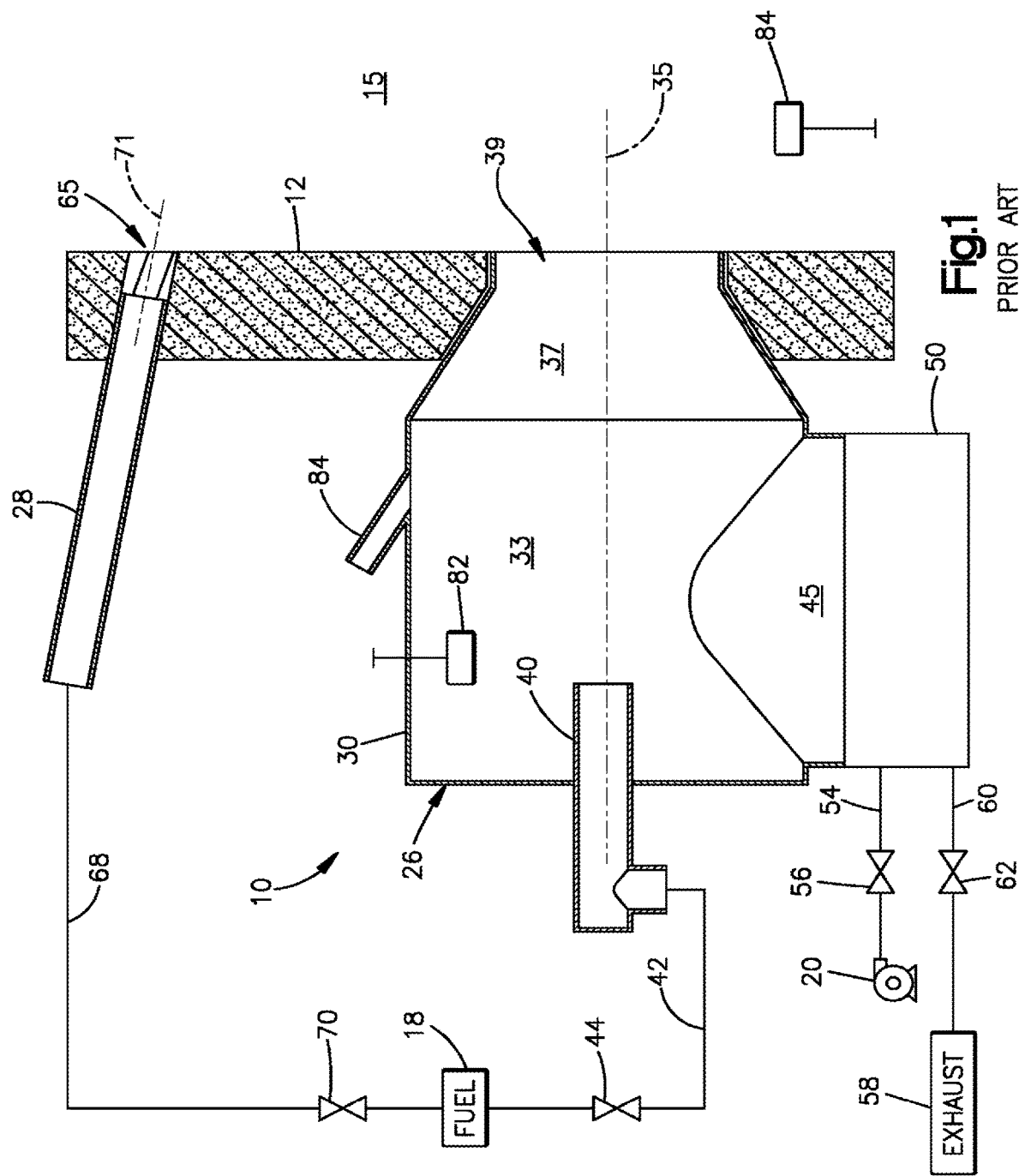
FIG. 1 is a partial view of a prior art furnace.

As shown partially in FIG. 1, a known furnace includes a burner system 10 mounted on a refractory wall 12 at the periphery of process chamber 15. The burner system 10 is connected with a source of fuel 18, such as a plant supply of natural gas, and a source of combustion air, such as a blower 20, to provide reactant streams for heating the process chamber 15 to elevated temperatures.

Two separate components of the system 10 are shown in FIG. 1, including a regenerative burner 26 and an adjacent fuel injector 28. The burner 26 has a cylindrical body wall 30 defining a reaction zone 33 with a central axis 35. An exit section 37 of the reaction zone 33 is tapered radially inward to an exit port 39 at the process chamber 15. A fuel inlet 40 at the opposite end of the reaction zone 33 communicates with the fuel source 18 through a first fuel line 42 with a valve 44.

An air inlet/exhaust outlet passage 45 communicates the reaction zone 33 with a regenerative bed 50 containing regenerative media. The regenerative bed 50 communicates with the blower 20 through an air supply line 54 with a valve 56. The regenerative bed 50 further communicates with an exhaust stack 58 through an exhaust line 60 with a valve 62.

The fuel injector 28 has a fuel injection port 65 at the process chamber 15, and communicates with the fuel source 18 through a second fuel line 68 with a valve 70. The fuel injection port 65 is located adjacent to the exit port 39, and is oriented to inject a fuel stream into the process chamber 15 along an axis 71 inclined toward the axis 35 at the regenerator 26.

A controller 80 (FIG. 2) is operatively connected with the blower 20 and the valves 56, 62, and 70. The controller 80 is configured to initiate, regulate, and terminate flows of fuel and combustion air to the system 10 to provide combustion for heating the process chamber 15.

The system 10 is operated in modes. These include a preheat mode to raise the process chamber 15 to an elevated temperature equal to or greater than the auto-ignition temperature of the fuel. The preheat mode is followed by an auto-ignition mode. In each mode, the system 10 is operated in cycles. The cycles include firing cycles that alternate with exhaust cycles.

The firing cycles in the preheat mode provide fuel to the burner system 10. Specifically, fuel from the source 18 is directed from the fuel inlet 40 into the reaction zone 33. Combustion air is simultaneously directed from the blower 20 through the regenerative bed 50 and further into the reaction zone 33. The fuel and air form a combustible mixture which, when ignited by an igniter 82, forms a flame that projects outward through the exit port 39 and into the process chamber along the axis 35. The tapered exit section 37 of the reaction zone 33 provides flame stabilization. Flame supervision is available through a viewing scope 84.

The exhaust cycles in the preheat mode do not provide fuel to the burner system 10. Instead, the fuel stream is interrupted, and high temperature gaseous contents of the process chamber 15 are discharged to the exhaust stack 58. Those gasses are directed through the regenerative bed 50 to heat the regenerative media, which can then serve as a heat source for preheating the inflow of combustion air in the next following firing cycle.

The system 10 is shifted from the preheat mode to the auto-ignition mode when a temperature sensor 84 indicates that the temperature of the process chamber 15 is at or above the autoignition temperature of the fuel. As in the preheat mode, the firing cycles in the auto-ignition mode direct combustion air from the blower 20 through the regenerative bed 50 and further into the reaction zone 33 along the axis 35. However, the firing cycles in the auto-ignition mode provide fuel to the fuel injector 28 instead of the burner 26. The fuel is injected from the injection port 65 into the process chamber 15 along the inclined axis 71 to mix with the combustion air flowing inward from the burner 26 along the central axis 35. The fuel is thus injected without flame stabilization. This provides diffuse combustion upon auto-ignition in the process chamber 15 at the elevated temperature.

Figure 2:
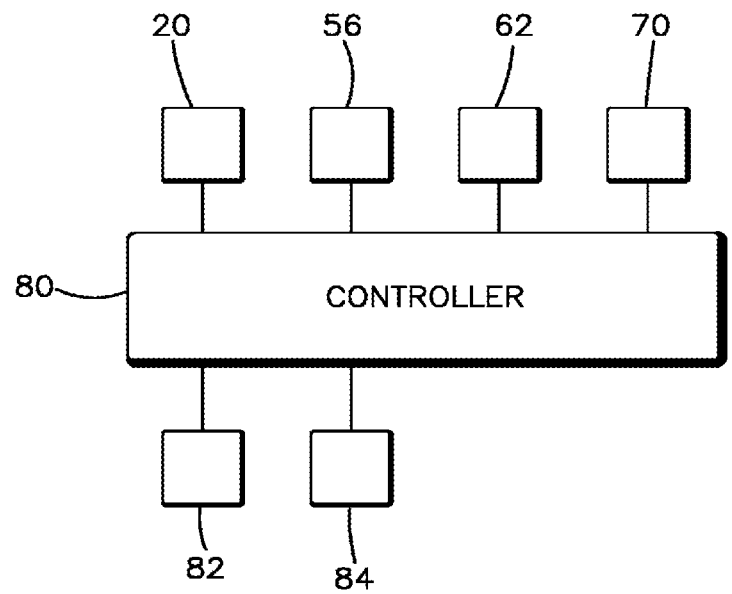
FIG. 2 is a schematic view of parts of the furnace of FIG. 1.

As further known in the art, the burner system 10 is one of a pair of systems, each of which is configured as shown in FIGS. 1 and 2. The two systems 10 are operated together in the alternating firing and exhaust cycles, with one operating in the firing cycle while the other is operating in the exhaust cycle. As a result, heating of the process chamber 15 is substantially continuous as the firing cycles alternate between the paired burner systems 10. The heating of regenerative media also is substantially continuous as the exhaust cycles alternate between the regenerative beds 50 in the paired systems.

Figure 3:
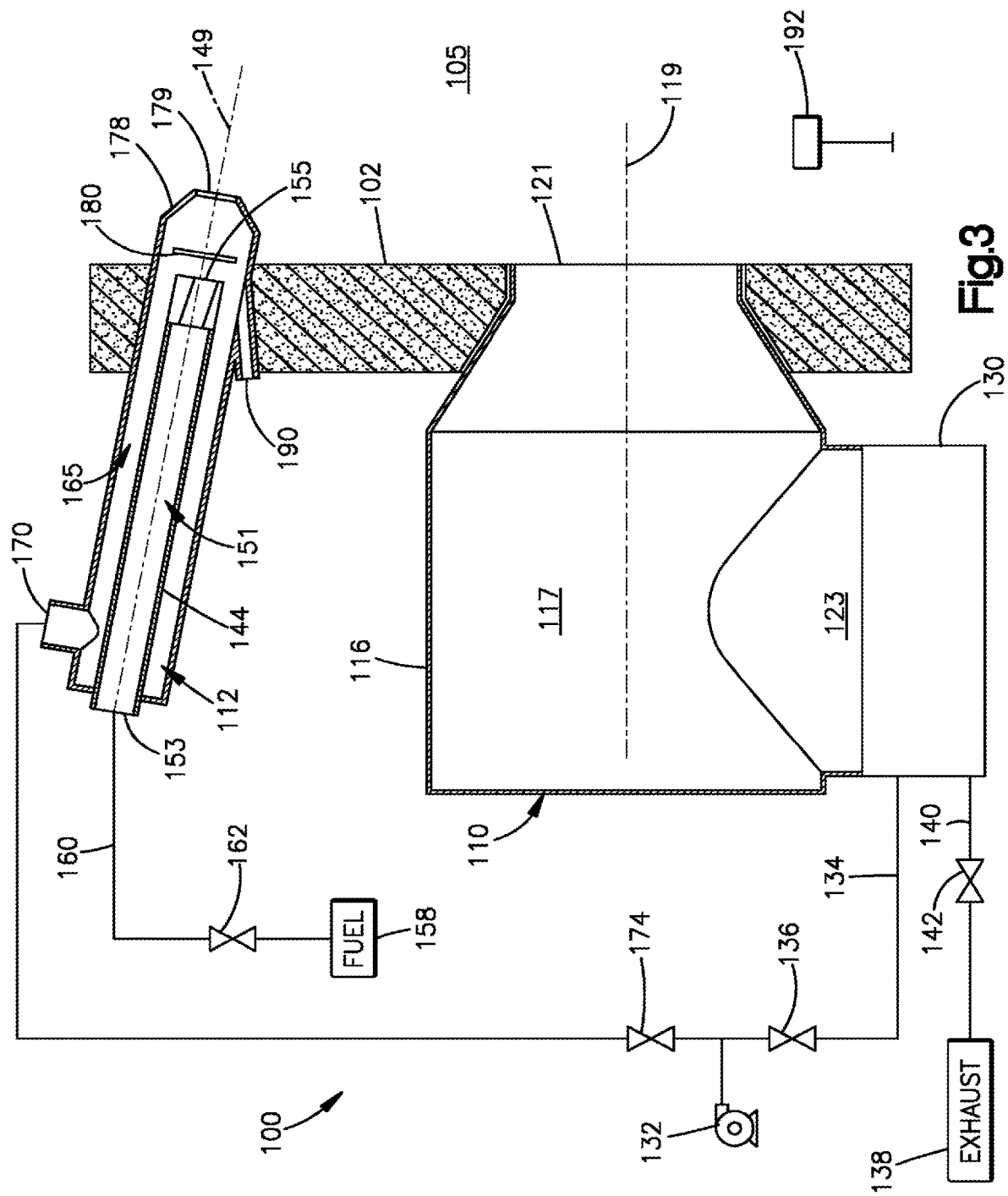
FIG. 3 is a view of a furnace including the claimed invention.

FIG. 3 shows a burner system 100 configured with the claimed invention. The system 100 includes examples of structural elements recited in the apparatus claims, and can be operated in steps recited in the method claims. These examples are described to provide enablement and best mode without imposing limitations that are not recited in the claims.

The burner system 100 is mounted on a refractory wall 102 at the periphery of a furnace process chamber 105. Two major components of the system 100 include a regenerator 110 and a reactant delivery device 112.

The regenerator 110 has a cylindrical body wall 116 defining a combustion air plenum 117 with a central axis 119 and a port 121 to the process chamber 105. An air inlet/exhaust outlet passage 123 communicates the plenum 117 with a regenerative bed 130 containing regenerative media. The regenerative bed 130 communicates with a blower 132 through an air supply line 134 with a valve 136. The regenerative bed 130 further communicates with an exhaust stack 138 through an exhaust line 140 with a valve 142. In the given example, the regenerator 110 is not connected in gas flow communication with a source of fuel gas, and does not have a fuel inlet or other fuel flow structure configured to direct fuel gas into the plenum.

The reactant delivery device 112 has a cylindrical shape defined by concentric tubes 144 and 148 centered on an axis 149. The inner tube 144 provides a fuel flow passage 151 with inlet and outlet ports 153 and 155. The inlet port 153 communicates with a source of fuel gas 158 through a fuel line 160 with a valve 162. An annular space between the tubes 144 and 148 provides a combustion air flow passage 165. A air inlet port 170 at one end of the outer tube 148 communicates the air flow passage 165 with the blower 132 through an air supply line 172 with a valve 174. A tapered section 178 at the opposite end of the outer tube 148 defines a fuel/air delivery port 179 centered on the inclined axis 149. The fuel/air delivery port 179 is spaced from the combustion air delivery port 121 at a location adjacent to the combustion air delivery port 121. Other fuel/air delivery ports may be provided, but "adjacent" is intended to mean that no other fuel/air delivery port is located closer to the combustion air delivery port 121. The fuel/air delivery port 179 is thus configured and oriented to direct a reactant stream into the process chamber 105 along the axis 149. The axis 149 is inclined toward the central axis 119 at the regenerator 110 so that the reactant stream from the fuel/air delivery port 179 will intersect with an air stream from the regenerator port 121 within the process chamber 105 after enough furnace gases have been entrained.

A stabilizer 180 is located within the outer tube 148 between the fuel outlet port 155 and the tapered section 178. The stabilizer 180, which is shown schematically, is configured to create the conditions required for a positioned flame front, and may have any suitable configuration known in the art. Examples include a perforated plate or bluff body, ported or swirl stabilized.

A controller 188 (FIG. 4) is operatively connected with the blower 132 and the valves 136, 142, 162, and 174, and is configured to initiate, regulate, and terminate flows of fuel and combustion air to the system 100 to provide combustion for heating the process chamber 105. The controller 188 may comprise any suitable programmable logic controller or other control device that is programmed or otherwise configured to operate the burner system 100 as described and claimed.

The system 100 can be operated in successive modes. For example, the system 100 can first be operated in a preheat mode to raise the process chamber 105 to an elevated temperature equal to or greater than the auto-ignition temperature of the fuel. The preheat mode can then be followed by an auto-ignition mode. In each mode, the system 100 is operated in alternating cycles. These include firing cycles that alternate with exhaust cycles.

In a firing cycle during the preheat mode of operation, only combustion air is provided to the regenerator 110. Both combustion air and fuel are provided to the reactant delivery device 112. Specifically, a first stream of combustion air is directed from the blower 132 through the regenerative bed 130 for preheating, and further through the plenum 117 and the port 121. The first stream of combustion air thus enters the process chamber 105 in a fuel-free condition.

A stream of fuel is directed from the source 158 to the fuel inlet port 153 at the fuel delivery device 112. The fuel stream flows through the inner passage 151 to the fuel outlet port 155. A second stream of combustion air is simultaneously directed from the blower 132 to the air inlet port 170 at the reactant delivery device 112. The second stream of combustion air flows though the outer passage 165 to the tapered section 178 of the outer tube 148. The second stream of combustion air then mixes with the fuel stream emerging from the outlet passage 155 to form a combustible mixture.

An igniter (not shown) is actuated to ignite the combustible mixture to form a flame that projects outward though the fuel/air outlet port 179 and into the process chamber along the inclined axis 149. The reactant delivery device 112 thus functions as a burner in the preheat firing cycles. The stabilizer 180 and the tapered section 178 of the outer tube 148 provide flame stabilization. Flame supervision is available through a viewing scope 190.

The controller 188 is preferably configured to operate the valves 162 and 174 such that the combustible mixture formed in the reactant delivery device 112 is fuel rich. This has the advantage of inhibiting the formation of NOx as a product of combustion. By separating the fuel gas from the combustion air stream at the regenerator 110, the reactant delivery device 112 can more readily provide a fuel rich mixture for combustion in the preheat mode, whereas the greater volume of combustion air in the regenerator 110 would preclude the formation of a fuel rich mixture in the preheat mode.

In an exhaust cycle during the preheat mode, the streams of fuel and combustion air are interrupted. Heated gaseous contents of the process chamber 105 are then directed outward through the plenum 117 and further through the exhaust line 140 to the stack 138. Those gasses are directed through the regenerative bed 130 to heat the regenerative media, which then serves as a heat source for preheating the inflow of combustion air in the next following firing cycle.

The system 100 is shifted from the preheat mode to the auto-ignition mode when a temperature sensor 192 indicates that the temperature of the process chamber 105 is at or above the auto-ignition temperature of the fuel. The firing cycles in the autoignition mode direct combustion air from the blower 132 through the regenerative bed 130 and further into the reaction zone 105 through the plenum 117. However, the firing cycles in the autoignition mode do not provide both fuel and air to the reactant delivery device 112. Instead, a fuel stream is directed to flow though the passage 151, but no air stream is provided to the corresponding passage 165. The fuel stream flows through the fuel/air outlet port 179 and into the process chamber 105 along the inclined axis 149 to mix with the combustion air flowing inward from the regenerator 110 along the central axis 119. The reactant delivery device 112 thus functions as a fuel injector in the auto-ignition firing cycles. Importantly, the fuel is injected without flame stabilization. This provides diffuse combustion upon auto-ignition in the process chamber 105 at the elevated temperature.

The exhaust cycles in the autoignition mode are the same as in the preheat mode.

Figure 4:
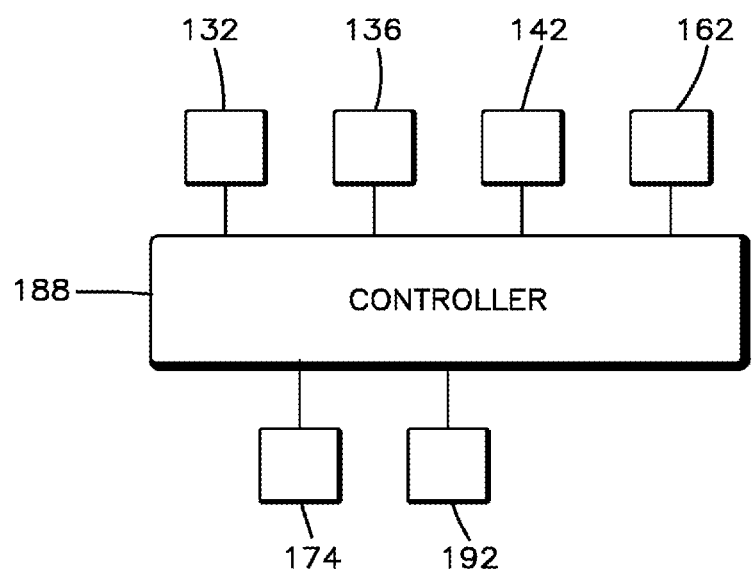
FIG. 4 is a schematic view of parts of the furnace of FIG. 3.

The system 100 is preferably one of a pair of systems, each of which is configured as shown in FIGS. 3 and 4. The two systems 100 are operated in tandem in the alternating firing and exhaust cycles, with one operating in the firing cycle while the other is operating in the exhaust cycle. Heating of the process chamber 105 is substantially continuous as the firing cycles alternate between the paired systems 100. The heating of regenerative media also is substantially continuous as the exhaust cycles alternate between the regenerative beds 130 in the paired systems.

Figure 5:
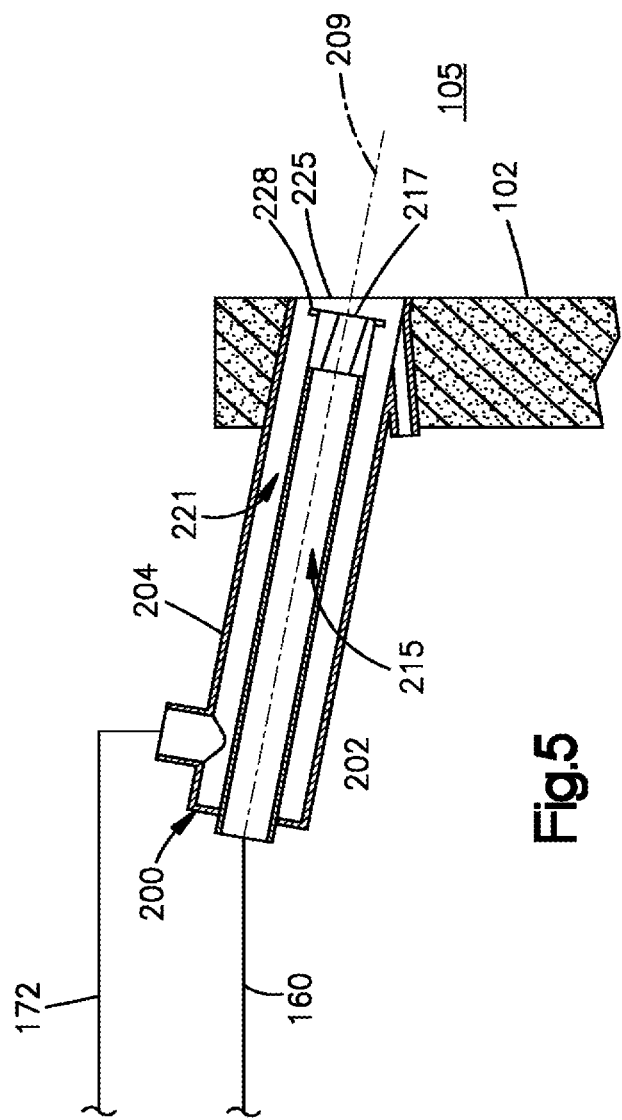
FIG. 5 is a an alternative embodiment for the furnace of FIG. 3.

An alternative embodiment of a reactant delivery device is shown partially in FIG. 5. In this embodiment, the device 200 also has a cylindrical shape defined by concentric tubes 202 and 204 centered on an axis 209. The inner tube 202 provides a fuel flow passage 215 with an outlet port 217. An annular space between the tubes 202 and 204 provides a combustion air flow passage 221. Unlike the outer tube 148 described above, this outer tube 204 does not have a tapered section at the respective fuel/air delivery port 225. A stabilizer 228 is provided, but is located axially adjacent to the fuel outlet port 217 so as to have little or no substantial affect on the flow of fuel outward from the fuel outlet port 217. These features may enhance the function of the device 200 as a fuel injector in the auto-ignition firing cycles.

This written description sets forth the best mode of carrying out the invention, and describes the invention so as to enable a person of ordinary skill in the art to make and use the invention, by presenting examples of the elements recited in the claims. The patentable scope of the invention is defined by the claims, and may include other examples that do not differ from the literal language of the claims, as well as equivalent examples with insubstantial differences form the literal language of the claims.

What is claimed is:

1. A system, comprising:
   a furnace having a process chamber;
   a source of fuel gas;
   a source of combustion air;
   a regenerator including a bed of regenerative material in air flow communication with the source of combustion air, wherein the regenerator has a combustion air plenum with a port configured to direct a stream of combustion air from the bed of regenerative material into the process chamber, and the regenerator is free of a fuel flow structure configured to direct fuel gas into the plenum;
   a reactant delivery device in gas flow communication with the source of fuel gas and the source of combustion air, wherein the reactant delivery device is configured to form a combustible mixture of fuel gas and combustion air, and to direct the combustible mixture into the process chamber adjacent to the stream of combustion air; and
   a controller configured to initiate, regulate and terminate flows of combustion air and fuel gas to provide combustion for heating the process chamber, wherein the controller is configured to carry out steps of:
   a) raising the process chamber to an elevated temperature equal to or greater than an auto-ignition temperature of the fuel gas by heating the process chamber in a preheat mode when the temperature of the process chamber is below the autoignition temperature of the fuel gas, including:
   forming preheated combustion air by directing combustion air through a heated regenerative bed;
   directing a stream of the preheated combustion air into the process chamber in a condition unmixed with the fuel gas;
   forming a fuel rich mixture of the fuel gas and combustion air; and
   directing the fuel rich mixture from the reactant delivery device into the process chamber adjacent to the stream of preheated combustion air, whereby the reactant delivery device functions as a burner in the preheat mode; and
   b) following the preheat mode, heating the process chamber in an auto-ignition mode when the temperature of the process chamber is at or above the auto-ignition temperature of the fuel gas, including:
   forming preheated combustion air by directing combustion air through the heated regenerative bed;
   directing a stream of the preheated combustion air into the process chamber in a condition unmixed with fuel gas;
   directing the fuel gas from the reactant delivery device into the process chamber in a condition unmixed with combustion air, whereby the reactant delivery device functions as a fuel injector in the auto-ignition mode.

2. The system of claim 1, wherein the fuel rich mixture is formed of the fuel gas and unheated combustion air.

3. The system of claim 1, wherein the fuel rich mixture is provided with flame stabilization.

4. The system of claim 1, further comprising an igniter operatively associated with the fuel delivery structure to ignite the combustible mixture.

5. The system of claim 4, wherein the controller is further configured to actuate the igniter to ignite the fuel rich mixture.

6. The system of claim 1, wherein the streams of the preheated combustion air are directed into the process chamber along a first axis, and the fuel rich mixture is directed into the process chamber along a second axis inclined toward the first axis.

7. The system of claim 1, wherein the reactants directed into the process chamber in the preheat mode consist of combustion air and fuel gas.

8. The system of claim 1, wherein the reactant delivery device is configured to provide the combustible mixture with flame stabilization.

9. The system of claim 1, wherein the regenerator is configured to direct the stream of combustion air into the process chamber along a first axis, and the reactant delivery device is configured to direct the combustible mixture into the process chamber along a second axis inclined toward the first axis.

* * * * *